(12) United States Patent
Bird et al.

(10) Patent No.: US 6,323,884 B1
(45) Date of Patent: Nov. 27, 2001

(54) ASSISTING USER SELECTION OF GRAPHICAL USER INTERFACE ELEMENTS

(75) Inventors: Colin Leonard Bird, Fair Oak; Sydney George Chapman, Winchester, both of (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/337,605

(22) Filed: Jun. 21, 1999

(30) Foreign Application Priority Data

Mar. 31, 1999 (GB) ................................................. 9907386

(51) Int. Cl.[7] ...................................................... G09G 5/08
(52) U.S. Cl. ................................................................ 345/810
(58) Field of Search ................................... 345/145, 146, 345/358, 810, 856, 863

(56) References Cited

U.S. PATENT DOCUMENTS

| 5,638,176 | 6/1997 | Hobbs et al. . | |
|---|---|---|---|
| 5,642,131 | 6/1997 | Pekelney et al. . | |
| 5,726,688 | * 3/1998 | Siefert et al. | 345/352 |
| 5,808,601 | 9/1998 | Leah, et al. . | |
| 5,870,091 | * 2/1999 | Lazarony, Jr. et al. | 345/346 |
| 5,898,423 | * 4/1999 | Tognazzini et al. | 345/158 |
| 6,005,567 | * 12/1999 | Nielsen | 345/334 |
| 6,152,563 | * 11/2000 | Hutchinson et al. | 351/209 |

* cited by examiner

*Primary Examiner*—Almis R. Jankus
*Assistant Examiner*—G. F. Cunningham
(74) *Attorney, Agent, or Firm*—Edward H. Duffield

(57) ABSTRACT

Provided are a method and a software-implemented mechanism for assisting a user of a graphical user interface (GUI) with the task of positioning an input device pointer (or otherwise indicating a position selection) when selecting a GUI element such as a button or other icon. The software identifies those GUI elements which are valid selections for the current application state and so are potentially the next element that the user will interact with. Then a predefined set of characteristics for the identified GUI elements are compared to predict which of these GUI elements will be the next GUI element that the user will interact with. The result of this prediction is indicated by moving the pointer to the position within the GUI of the predicted GUI element or by adding emphasis to the predicted GUI element. The user then decides whether this GUI element is required.

17 Claims, 3 Drawing Sheets

ASSISTING USER SELECTION OF GRAPHICAL USER INTERFACE ELEMENTS

FIELD OF INVENTION

The present invention relates to improved ease of use for graphical user interfaces (GUIs), and in particular to assisting the user in the operation of selecting a destination or element within a GUI.

BACKGROUND OF THE INVENTION

Apparatus is known which tracks the eye movement of a user of a GUI to determine what position within the interface is being viewed, using reflections of signals from the user's retina. When the user's eye focuses on a single position corresponding to a selectable element of the interface for a predefined period of time (for example 0.3 seconds), this is interpreted as selection of the element. Example selectable GUI elements are icons such as buttons, and items in a context menu or scrollable list.

There is a problem with the known eyeball tracking mechanisms, which is that they are not very accurate. The accuracy can be adequate for very simple interfaces in which the GUI elements are each very large, but a requirement for very large GUI elements is often unacceptable for real applications where there is limited display space available for each element and it is likely to result in an unattractive and simplistic GUI. Furthermore, eye tracking selection mechanisms may not perform well even for large GUI elements if the user focuses near an edge of the GUI element. A mechanism is needed for dealing with the inaccuracy of the eye tracking mechanisms to allow eye tracking to be used with any desired interface design.

There are other types of apparatus for which fast and accurate selection of a GUI element is difficult to achieve. For example, touch-response screens and any apparatus which has a small display screen and relies on user-controlled positioning of a pointer for selection of GUI elements has the problem of positioning the pointer within the small screen area of the desired GUI element. Examples of such apparatus are laptop computers and some personal digital assistants (PDAs).

The positioning problem is a particular concern for users of GUI selector mechanisms who have physical limitations affecting their ease of use, but ease of use is of major importance for all users.

Warping of an input device pointer to a newly created window is used, for example, by the Motif(TM) Window Manager (which is the default window manager of The Open Group's Motif user interface standard). However, this is an inflexible action which is only taken when the window is created.

U.S. Pat. No. 5,745,100 discloses an input device pointer remapping facility which causes an input device pointer, when entering a region on a computer display, to jump to a specific point within the region such as the centre of the region. Further movements of the pointer through the region are then adjusted to increase the likelihood that the pointer will remain in the region. There is at most only one predefined fixed point which is an active jump point for any position of the pointer within the display screen.

U.S. Pat. No. 5,737,555 discloses rapid repositioning of a display pointer to a predefined location on a display screen in response to an input stimulus. This saves the user from physically moving the pointer but relies on a predefined order of display pointer movement between elements of a GUI (i.e. a predefined action sequence) to identify the next predefined pointer location.

IBM Technical Disclosure Bulletin article "Method for simplifying the accurate positioning of a mouse pointer", P. Hanna, vol.36, No.4, April 1993, pages 339–342, discloses using an heuristic to predict the intended destination of a user-controlled mouse pointer movement and then automatically moving the pointer to that destination. The mouse pointer's initial position and directed acceleration are used to calculate a force vector which is then matched to actual positions of mouse-selectable areas. The acceleration must exceed a predefined threshold for the automated movement to be initiated. However, the initial user-controlled acceleration of an input device pointer may not be proportional to the distance that the user intends to move the pointer, and so the reliance on measured acceleration will tend to produce erroneous predictions. Secondly, no account is taken of the current application program state and so the pointer may be moved to mouse-selectable areas which are not currently valid selections.

DISCLOSURE OF THE INVENTION

The invention provides a software-implemented mechanism for assisting a GUI user with the task of selecting a GUI element. The software controls the operation of a computer to execute processes to identify those GUI elements which are potentially the next GUI element that the user will interact with, to compare a predefined set of characteristics for the identified GUI elements to predict which of these GUI elements will be the next element that the user will interact with, and to visually indicate the result of the prediction.

The identified potential next GUI elements are preferably the complete set of GUI elements that are valid next selections for the current application state. Alternatively, the identified GUI elements may be the set of validly selectable GUI elements which are within the currently active window within the GUI, and the software implementing the invention may be invoked in response to opening of a new window to predict which GUI element within the window the user is likely to interact with. The identified GUI elements could equally be the subset of GUI elements which satisfy any predefined criteria.

The predefined set of characteristics preferably include a distance measurement between a user indicated position within the GUI and the position of each potentially selectable GUI element. The user indication of a position may comprise focusing of the eye, as measured by an eye tracking mechanism, orientation of the user's head or some other measurable body movement, or user-controlled positioning of an input device pointer. The step of comparing a set of characteristics is preferably initiated when the user indicated position moves to within a predefined distance of a selectable GUI element.

Alternatively or additionally, the set of characteristics may include a determination of whether the identified GUI elements are within a user indicated region of the GUI, the user indication including an initial user-controlled movement of a selection pointer and a vector representing the direction of movement and starting position of the pointer being calculated by the software.

According to a preferred embodiment, the set of characteristics include weightings associated with each of the GUI elements, the weightings indicating a likelihood of selection of each element given the last GUI element selected or taking account of a sequence of previous selections. The weightings are preferably based on statistics of previous sequences of user interactions, such that the prediction accuracy improves over time as the weightings change in response to user interactions. This capacity of the software to learn over time and to use weightings based on previous user interaction sequences to predict a next GUI element is a significant improvement over prior art selection mechanisms.

For example, if the valid next GUI elements following a given interaction are a "Proceed" button and a "Cancel" button, then the software refers to its maintained statistics of previous selections and predicts which button will be selected next based on this previous experience. The software then moves a selection pointer into the area of the GUI of the selected button (if the selection mechanism uses a pointer) or adds emphasis such as a highlight colour or animation of the selected button. There may be no input pointer if the selection mechanism is eye tracking. This movement of a pointer or addition of emphasis to a selectable GUI element does not force the user to take that option, it merely assists them with the positioning task.

The invention can provide great assistance where certain sequences of interactions involving selection of GUI elements are predictable, since the associated pointer movements or addition of emphasis can be performed semi-automatically. In some circumstances, this could greatly reduce the hand movements required to navigate a GUI, with potential health benefits.

The software preferably performs an interrupt of the automatic pointer movement operation if the user interacts with the GUI between initiation and completion of the movement operation. Thus, the user is able to take back control at any time and to move the pointer anywhere in the GUI.

In a particular preferred embodiment of the invention, the comparison of characteristics of GUI elements balances weightings indicating likelihood of selection given the current interaction sequence (or application "state") and distances of each potential next GUI element from a user indicated position in the GUI. Such a comparison of multiple characteristics for multiple GUI elements to predict a next GUI element selection, including dynamic characteristics such as mouse pointer position and time-varying weightings, can achieve predictions which match the user's desired next GUI element in a large proportion of cases.

Many different prediction policies can be defined for identifying a likely next interaction between a plurality of GUI elements. These will be described in more detail later.

For multi-state GUI elements, the software may additionally trigger a change of state of the predicted GUI element (for example a button) to an active state such that the button becomes the default GUI element which is responsive to subsequent user interactions such as pressing an ENTER key on a keyboard. Some GUI elements have only two states—selected and not selected—and for these GUI elements the result of the prediction will not be to trigger a change of state of the GUI element, since the invention does not complete a selection operation and change the state of the application (even when it changes the state of a GUI element). The invention merely assists the user by predicting a next interaction and then leaves the user to decide whether or not to take the predicted action.

BRIEF DESCRIPTION OF THE DRAWINGS

Preferred embodiments of the invention will now be described in more detail, by way of example, with reference to the accompanying drawings in which.

DESCRIPTION OF THE PREFERRED EMBODIMENTS

Figure 1:
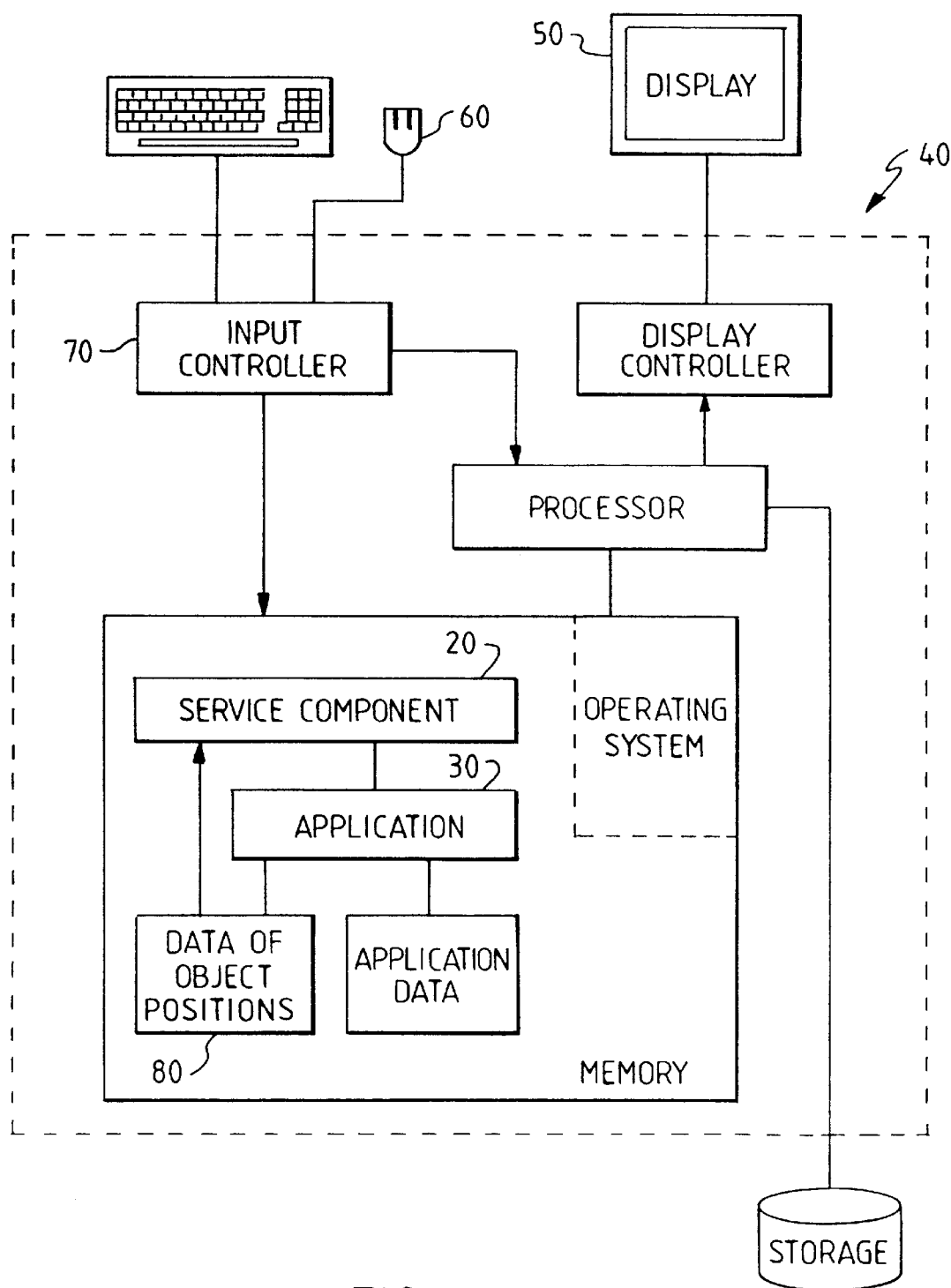
FIG. 1 is a schematic representation of a computer system in which the present invention may be implemented.

The present invention is preferably implemented within an application program or within a software service component which provides services on behalf of an application program. The application program or software service component may be provided as a computer program product comprising computer readable program code recorded on a computer readable recording medium, for controlling the operation of computing apparatus on which it is run. The invention is not limited to any particular type of computing apparatus, but has particular advantages for apparatus which uses eye tracking mechanisms for user input and apparatus such as PDAs which have a relatively small display area for displaying a GUI such that individual GUI elements are small. The invention also has advantages for computing apparatus which includes an input device which is hard to control with high accuracy and also for users of computing apparatus who have physical limitations on their ability to control input devices.

A first embodiment of the invention will now be described, comprising a software-implemented service component 20 for interoperating with application programs 30 on a mobile computing device 40 having a small display screen area 50, such as a PDA or hand-held computer. The service component 20 may be part of a toolkit providing a range of run-time services for application programs. Example PDAs are 3Com Corporation's PalmPilot(™) and its successor products. Within a GUI of a PDA, individual buttons may be as small as 12 pixels square such that it is difficult to make a positive selection of a specific button with any continuous positioning mechanism that is fully controlled by the user (i.e. devices such as a mouse 60, IBM Corporation's Trackpoint(™) input device or a light pen, as distinct from discrete selection using tab keys).

An application program 30 for which the services of the service component 20 are required is registered with the service component at installation time. The service component stores an application handle for use when subsequently querying the application program code at execution time to determine which GUI elements are potential elements for the next user interaction at any point within the application program's execution. The application program needs to maintain its own state information and to calculate which GUI elements are valid selections at all stages of execution, and this information is provided to the service component when required. The service component queries the application program in response to each user interaction with a GUI element, to establish which elements are potentially the next GUI element for a user interaction. This will be described later. In some GUI implementations, GUI elements which are not valid selections will have their visual appearance changed by the application program (for example, they will be 'greyed out') to indicate that they cannot be activated.

In alternative embodiments the service component could maintain a state table for the application program, calculating the application state in response to each user interaction and determining which GUI elements are potential selections.

As is known in the art, an input device driver 70 such as a mouse driver provides a pointer position listener which maintains current coordinate information for the pointer, periodically sampling the pointer's position. A typical input device driver will sample the pointer position 30 times per second. The input device driver is also a controller of pointer movement in response to the input device.

The application program maintains coordinates 80 for its GUI elements. The application program responds to the operating system's identification 100 that a selection event has occurred (as identified, for example, by a click of the left mouse button) by performing a comparison between the coordinates of the input device pointer provided by the input device driver and the application-maintained coordinates of GUI elements. This determines 110 which GUI element has been selected. The application program generates 120 a new state table relevant to its current state and determines which GUI elements are valid selections in the current application state. The application handles the visual indication 130 of which GUI elements cannot be activated in the current application state.

The service component includes a selection listener component which responds to the operating system's identification 100 that a GUI element selection event has occurred by generating 140 a query to the application program. This query requests identification of which GUI element has been selected, the current application state following the selection, and the set of GUI elements which are valid selections for the current application state. On receipt of the query result 150 from the application program, the selection listener component increments 160 values in memory corresponding to statistics of particular user interactions for particular states of the application program.

For example, for a word processor application program in an input mode there may be five GUI elements which are selectable by a user—SAVE, CUT, COPY, FONT and EXIT buttons in a toolbar. The statistics of previous user selections in this mode stored in memory at a particular point in time may include 10 clicks on SAVE, 43 clicks on CUT, etc, as shown below:

| SAVE | CUT | COPY | FONT | EXIT |
|------|-----|------|------|------|
| 10   | 43  | 2    | 1    | 2    |

If certain conditions are met following receipt of the query result from the application program, the service component performs a prediction of which GUI element will be the next GUI element to be interacted with by the user and controls the input device pointer driver to move the pointer to the GUI position of that GUI element. The relevant conditions are user-controlled movement of the input device pointer to within a predefined distance of one of the validly selectable GUI elements.

The service component also includes a distance calculator which compares the pointer position coordinates periodically provided by the input device driver with the application-maintained coordinates of GUI elements. When this distance calculation 200 produces a sufficiently small result for one of the validly selectable GUI elements, this triggers performance of the prediction operation. Note that the prediction operation is not triggered by proximity of the pointer to a GUI element which is non-selectable in the current application state.

The service component then retrieves 210 the state-specific user interaction values from memory and uses these to dynamically generate weightings associated with each of the GUI elements which are selectable for the current application state. These weightings are combined to form a weighting vector which is provided to a prediction unit within the service component.

The prediction unit then calculates 220 the most likely next GUI element for subsequent user interaction using the dynamically generated weighting vector, the distance measurements, and a predefined prediction policy. Many different prediction policies are possible.

In a first example embodiment, the prediction policy generates 220 a probability value P for each GUI element which is proportional to the weighting W divided by the square of the distance measurement r, but with all GUI elements beyond a predefined maximum distance $r_{max}$ excluded from consideration regardless of their weighting. This is represented below:

$$P_i = S\frac{W_i}{r_i^2}; P_i = 0 \text{ for } r_i > r_{max}$$

where S is a scaling constant and i is the index in the vector.

This example prediction policy takes account of the statistics of previous user selections of GUI elements and the position to which the user has moved the pointer.

The probability values for all selectable GUI elements are then compared 220 with each other and the highest value identified. This identifies a particular GUI element as the predicted element of the next user interaction. The service component then instructs 230 the input device driver to move the input device pointer to overlay the predicted GUI element, using the GUI element coordinates obtained from the application program. Using the previous example, the invention is able to automatically complete a user-initiated movement of a mouse pointer to overlay a CUT button on a toolbar. The state of the CUT button is changed to 'active'. The application program or the service component may additionally change the visual appearance of the CUT button to indicate that it is now the active GUI element for subsequent user interaction.

Figure 2A:
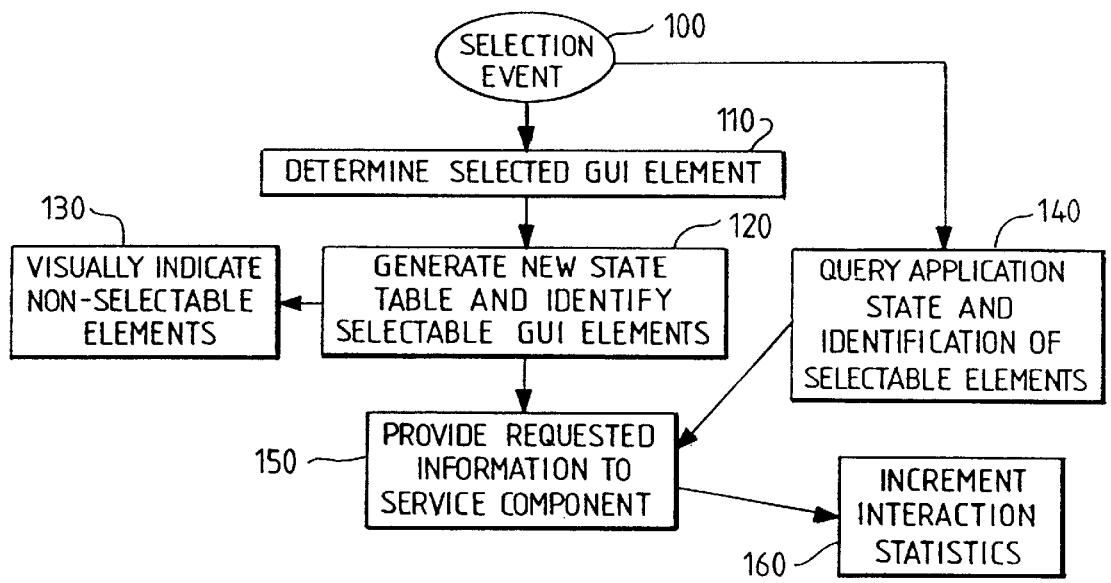
FIGS. 2A and 2B represent the sequence of operations of a first embodiment of the invention.
Figure 2B:
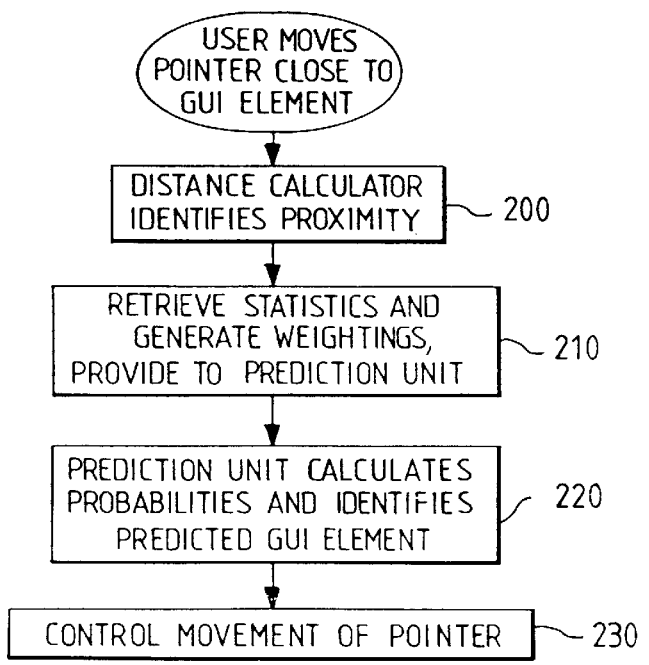
Figure 3A:
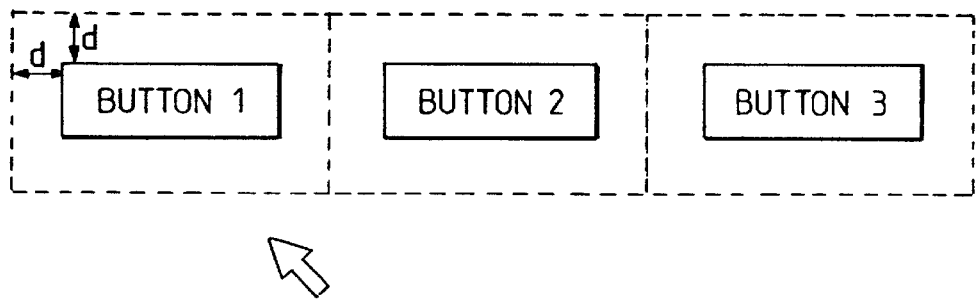
FIGS. 3A to 3C are representations of the operation of the invention according to a first embodiment from the perspective of a user of computing apparatus in which the invention has been implemented.
Figure 3B:
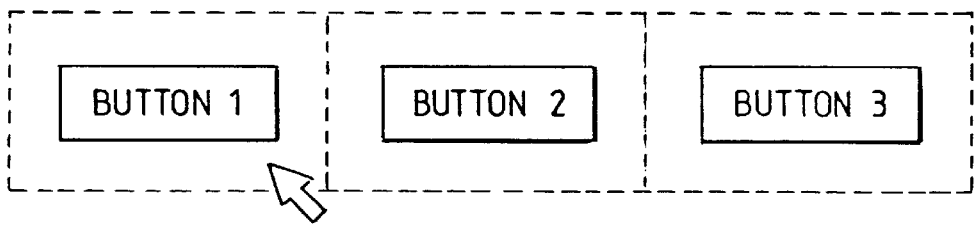
Figure 3C:
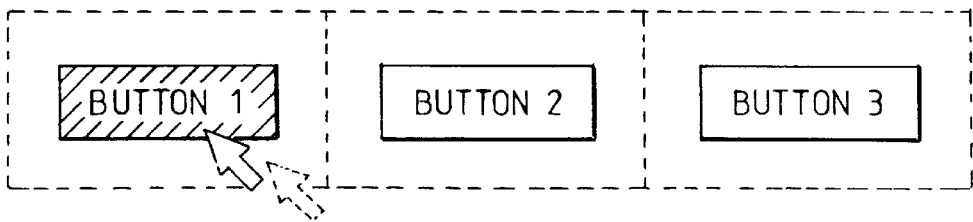

This sequence of operations as seen by the user is shown by way of example in FIGS. 3A to 3C. (The hatched lines around each button are shown to aid understanding—these would typically not be visible to the user). When the input device pointer is at a distance from all of the selectable GUI elements (Buttons 1,2,3) which is greater than a predefined distance d, as shown in FIG. 3A, the prediction mechanism remains idle. When the user moves the pointer within distance d of one of the buttons, as in FIG. 2B, the prediction mechanism is activated to predict which of the GUI elements is the most probable next GUI element for user interaction. The input device pointer is then moved to overlay a predicted button, as shown in FIG. 3. The predicted button is also shown visually changed.

If the user wishes to select this button, a mouse click or equivalent user input device action is all that is required. If the user wishes to select a different option, they merely move the pointer to a different position.

Alternatively, options such as SAVE, CUT, COPY, and EXIT may be the selectable options within a drop down menu list which appears on the screen in response to user positioning of a mouse pointer over an EDIT option within a menu bar and clicking the mouse button to select. The prediction unit calculates the highest probability of selection of individual items in the drop down menu using statistics for previous selections. The state of the predicted menu item is then changed to active and the predicted item is highlighted to indicate that it is the active option.

In this example, the prediction is advantageously performed before the user attempts to move the pointer to any particular item within the menu list and so, if the prediction produces a desired result, the user is saved from any positioning effort subsequent to selection of EDIT. The identification of potential next selections is limited to the valid options within the drop down menu list (i.e. GUI elements elsewhere in the GUI are ignored for this prediction). The prediction policy does not include a distance measurement for this example, since there is no initial attempt by the user to position a pointer. However, a measurement of the distance between pointer and GUI element may have been used as a characteristic for predicting user selection of the EDIT button and moving the pointer to the EDIT button in the first place.

The above example indicates how widely applicable the invention is and that different implementations of the invention may be used for a single application program.

A further example is where a number of GUI elements are selectable from within a dialog box or window. The mechanism for prediction of a next interaction is invoked when the dialog box or window is displayed on the GUI, and the identification of potential next GUI elements is limited to the GUI elements within the dialog box or window. This extends the concept of warping an input device pointer to a newly created window which is known from the Motif Window Manager by predicting what element within the window the user will want to interact with. As an example, a window which is created during Web browsing may include an extract from a hypermedia document. The document's hypertext links or media links are selectable GUI elements. The mechanism according to the present invention can predict which link the user will wish to select and then highlight that link, possibly also changing the link to an active state such that it will be selected if the user presses the ENTER key on a keyboard.

The above examples include prediction policies which take account of both distance from GUI elements and weightings based on previous user interactions, and prediction policies which only use weightings. Alternative prediction policies include policies where the only characteristic which needs to be considered is a distance between a pointer and GUI elements. This latter alternative may be most appropriate where the next user interaction is not reliably predictable for the current stage of application execution using any other characteristic. For example, if the GUI elements are colour 'cards' within a colour chart from which a user can choose the colour for displaying an icon, it may be inappropriate to predict user selection using any measure other than the proximity of a user-positioned pointer.

A modification of the above setting of prediction policies so as to remain appropriate for the particular GUI and current application operation is to set prediction probability thresholds. If the prediction step does not identify one particular GUI element with significantly higher probability than alternatives and with at least a minimum probability, then the step of repositioning the pointer (and possibly changing a GUI element's state to active) will not be performed. Implementations of the invention which include such thresholds will reduce the tendency for prediction results which do not match user requirements, and so can increase user satisfaction. The appropriate thresholds will differ for different applications and different stages of application execution.

A further control may be implemented to prevent repeated automated movement of the pointer to a position which is not desired by the user, since that could be extremely annoying. This is achieved by limiting the number of times that the prediction and movement mechanism can perform its operations between each user selection. For example, if the input device pointer is automatically moved to overlay a first GUI element and the user chooses to move the pointer away without selecting the predicted GUI element, then this is interpreted as a failed result and the prediction operation is disabled until re-activated by a subsequent user selection.

As a modification of the step of disabling prediction after a failure, an alternative is to change the prediction policy following a failure. One example is for an initially predicted GUI to be discounted from a second prediction after the user has indicated that the first prediction result was a failure.

Many different prediction policies are possible. A further example is to perform a first prediction using distance measurements and weightings and then, if the result is identified as a failure by the user moving the pointer away from the predicted GUI element, a second prediction may be performed which only uses a distance measurement or which takes greater account of distance (for example, using $r^{-3}$ instead of $r^{-2}$) to reduce the likelihood of a second prediction repeating the result of the first.

The above description of a preferred embodiment of the invention relates to a mechanism which learns from previous user interactions, dynamically generating weightings calculated from statistics of user interactions. This has the advantage that the predictions should more closely follow the user's interactions over time. Also within the scope of the invention are embodiments in which weightings are fixed values assigned by an application developer.

The above description of preferred embodiments include descriptions of trigger events which start the prediction processing, such as a pointer moving to within a predefined distance from a selectable GUI element, or a window or dialog box being opened. In alternative embodiments, the mechanism could be activated each time the operating system identifies a GUI element selection event, or could even be active continuously until an interrupt event occurs. Such an interrupt event could be the identification of a prediction failure, as described above.

A second embodiment of the invention will now be described, comprising an application program for use within computing apparatus using eye tracking technology wherein the novel features required for implementing the invention are provided within the application program itself. An example eye tracking system is described in U.S. Pat. No. 5,638,176 which is incorporated herein by reference.

The application program presents a plurality of GUI elements on a display screen. The computing apparatus includes eye tracking apparatus for identifying user interactions with the GUI. Known eye tracking apparatus is typically inaccurate and may fail to accurately identify the GUI position that a user wishes to select. This embodiment assists the user with the task of selecting a GUI element by associating a GUI position identified by the eye tracking apparatus with a GUI element when the distance between the two positions is less than a predefined distance.

As with the input device pointer examples, the mechanism of the invention (in this case, implemented within the application program) identifies the GUI elements which are potentially the next GUI element that the user will interact. Let us assume that these are the set of all GUI elements which are valid selections for the current application state. When the coordinates of a user identified position provided by the eye tracking apparatus are determined by a distance calculator within the application program as being within a predefined distance of one of the identified GUI elements (coordinates of which are held in memory for access by the application), this triggers comparison of a predefined set of characteristics for the identified GUI elements and prediction of which one of these GUI elements will be the next element that the user will interact with.

The characteristics used in the prediction include (possibly as a sole characteristic) the distances of each selectable GUI element from the user-indicated position, such that the nearest selectable GUI element to the user-indicated position will typically be identified in the prediction result. The prediction could also include weightings which relate to the likelihood of user interaction with each selectable GUI element for the current application state. The weightings may be calculated from previous user statistics, as described above.

The application program visually indicates the result of the prediction by adding emphasis to the predicted GUI element, such as highlighting or animating the GUI element. The user must then decide whether the predicted GUI element should be selected or not. Some eye tracking mechanisms enable a user signal such as blinking or remaining focused on a point for a predefined time to trigger the selection.

In an alternative embodiment which determines a region of the GUI towards which the user is moving a pointing device based on the initial position and direction (and possibly also the speed or acceleration) of the initial user-controlled movement, the distances between the GUI element positions and the approximated position of the pointer may simply be used as a threshold value for determining which GUI elements are to be considered and which excluded from consideration and then weightings will be used as the characteristics to be compared for predicting which GUI element is the next GUI element for user interaction.

What is claimed is:

1. A computer program product comprising computer readable program code stored on a computer readable recording medium for assisting a user of computing apparatus in the task of selection of a GUI element within a computer program by controlling the operation of a computing apparatus to execute processes:
   to identify those GUI elements within a currently displayed GUI which correspond to valid user interactions for the current state of the computer program which includes the GUI, and hence are potentially the next element that the user will interact with;
   to evaluate a predefined set of characteristics for the identified GUI elements to predict which of these GUI elements will be the next element that the user will interact with, wherein the set of characteristics include: distance measurements between a user indicated position within the GUI and the position of each GUI element; and weightings which are associated with individual GUI elements and which indicate a likelihood of selection of the respective individual GUI elements for said current program state; and
   to visually indicate the result of the prediction.

2. A computer program product according to claim 1, wherein the evaluation of characteristics to predict a next GUI element is initiated when a user indicated position within the GUI is within a predefined distance of one of the identified GUI elements.

3. A computer program product according to claim 1, wherein the user indication of a position within the GUI comprises focusing of the eye, as measured by an eye tracking mechanism within the computing apparatus.

4. A computer program product according to claim 1, wherein the user indication of a position within the GUI comprises user-controlled positioning of an input device pointer.

5. A computer program product according to claim 1, wherein the predefined set of characteristics include a parameter identifying whether the identified GUI elements are within a user indicated region of the GUI, the user indication of a region comprising an initial user-controlled movement of a selection pointer and the direction of movement being calculated by the program code.

6. A computer program product according to claim 1, wherein the computer program controls the computing apparatus to execute processes to record statistics of user interaction sequences and the weightings are generated from the statistics of previous user interaction sequences.

7. A computer program product according to claim 1, wherein visually indicating the result of the prediction includes moving an input device pointer to overlay the predicted GUI element.

8. A computer program product according to claim 7, wherein the movement of the input device pointer is a progressive movement to the position of the predicted GUI element from the position of the input device pointer when the prediction was initiated.

9. A computer program product according to claim 1, wherein visually indicating the result of the prediction includes adding emphasis to the predicted GUI element.

10. A computer program product according to claim 1, wherein the step of visually indicating the result of the prediction is only performed if the prediction step predicts interaction with a particular GUI element with at least a predefined minimum probability.

11. A computer program product according to claim 1, wherein the computer program is triggered to perform its processes by opening of a new window within the GUI, the identification of potential next GUI elements then being limited to GUI elements within the new window.

12. A computer program product comprising computer readable program code, recorded on a computer readable recording medium, the program code including a service component for providing run-time services to application programs to assist a user of computing apparatus with the task of selection of a GUI element within an application program by controlling the operation of a computing apparatus to execute processes
   to identify those GUI elements within a currently displayed GUI which correspond to valid user interactions for the current state of the application program which includes the GUI, and hence are potentially the next element that the user will interact with;
   to evaluate a predefined set of characteristics for the identified GUI elements to predict which of these GUI elements will be the next element that the user will interact with, wherein the set of characteristics include: distance measurements between a user indicated position within the GUI and the position of each GUI element; and weightings which are associated with individual GUI elements and which indicate a likelihood of selection of the respective individual GUI elements for the current application program state; and
   to visually indicate the result of the prediction.

13. A method for predicting and indicating to a user of computing apparatus a prediction of a next GUI element within a computer program with which the user will interact, the method including the steps of:
   identifying those GUI elements within a currently displayed GUI which correspond to valid user interactions for the current state of the computer program which includes the GUI, and hence are potentially the next GUI element that the user will interact with;

evaluating a predefined set of characteristics for the identified GUI elements to predict which of these GUI elements will be the next element that the user will interact with, wherein the set of characteristics include: distance measurements between a user indicated position within the GUI and the position of each GUI element; and weightings which are associated with individual GUI elements and which indicate a likelihood of selection of the respective individual GUI elements for the current program state; and visually indicating the result of the prediction.

14. A computer program product comprising computer readable program code recorded on a computer readable recording medium, the program code including:

means for identifying GUI elements within a currently displayed GUI which correspond to valid user interactions for the current state of the computer program which includes the GUI, and hence are potentially the next GUI element that the user will interact with;

a prediction unit for evaluating a predefined set of characteristics for the identified GUI elements to predict which of the identified GUI elements will be the next element that the user will interact with, wherein the set of characteristics include: distance measurements between a user indicated position within the GUI and the position of each GUI element; and weightings which are associated with individual GUI elements and which indicate a likelihood of selection of the respective individual GUI elements for the current state of the computer program which includes the GUI; and means for visually indicating the result of the prediction.

15. A method, implemented in a computing apparatus including eye tracking apparatus for identifying user interaction with a GUI of a computer program, for assisting a user with the task of selecting a GUI element, the method including the steps of:

identifying those GUI elements within a currently displayed GUI which correspond to valid user interactions for the current state of the computer program which includes the GUI, and hence are potentially the next GUI element that the user will interact with;

in response to identification by the eye tracking apparatus of a user indication of a position within the GUI, determining whether the indicated position is within a predefined distance of one of the identified GUI elements and, if within said predefined distance, evaluating a predefined set of characteristics for the identified GUI elements to predict which of these GUI elements will be the next element that the user will interact with, wherein the set of characteristics include: distance measurements between a user indicated position within the GUI and the position of each identified GUI element; and weightings which are associated with individual GUI elements and which indicate a likelihood of selection of the respective individual GUI elements for said current program state; and visually indicating the result of the prediction including adding emphasis to the predicted GUI element.

16. An interactive data processing apparatus including a GUI and eye tracking apparatus for identifying user interaction with the GUI, the data processing apparatus including computer program code for assisting a user with the task of selecting a GUI element, the program code including:

means for identifying GUI elements within a currently displayed GUI which correspond to valid user interactions for the current state of the computer program which includes the GUI, and hence are potentially the next GUI element that the user will interact with;

a prediction unit for evaluating a predefined set of characteristics for the identified GUI elements to predict which of the identified GUI elements will be the next element that the user will interact with, wherein the set of characteristics include: distance measurements between a user indicated position within the GUI and the position of each identified GUI element; and weightings which are associated with individual GUI elements and which indicate a likelihood of selection of the respective individual GUI elements for said current program state; and means for visually indicating the result of the prediction.

17. A data processing apparatus including means for implementing a method for predicting and indicating to a user of computing apparatus a prediction of a next GUI element within a computer program with which the user will interact, the apparatus including:

means for identifying those GUI elements within a currently displayed GUI which correspond to valid user interactions for the current state of the computer program which includes the GUI, and hence are potentially the next GUI element that the user will interact with;

means for evaluating a predefined set of characteristics for the identified GUI elements to predict which of these GUI elements will be the next element that the user will interact with, wherein the set of characteristics include: distance measurements between a user indicated position within the GUI and the position of each GUI element; and weightings which are associated with individual GUI elements and which indicate a likelihood of selection of the respective individual GUI elements for the current program state; and means for visually indicating the result of the prediction.

* * * * *